(12) United States Patent
Kilduff et al.

(10) Patent No.: US 11,652,642 B2
(45) Date of Patent: May 16, 2023

(54) DIGITAL DATA LOCKER SYSTEM PROVIDING ENHANCED SECURITY AND PROTECTION FOR DATA STORAGE AND RETRIEVAL

(71) Applicant: Escher Group (IRL) Limited, Dublin (IE)

(72) Inventors: Alan Kilduff, Greystones (IE); Ronan O'Hurley, Dublin (IE)

(73) Assignee: Escher Group (IRL) Limited, Dublin (IE)

( * ) Notice: Subject to any disclaimer, the term of this patent is extended or adjusted under 35 U.S.C. 154(b) by 57 days.

(21) Appl. No.: 17/306,059

(22) Filed: May 3, 2021

(65) Prior Publication Data

US 2021/0320803 A1 Oct. 14, 2021

Related U.S. Application Data

(60) Continuation of application No. 16/660,019, filed on Oct. 22, 2019, now Pat. No. 11,038,692, which is a
(Continued)

(51) Int. Cl.
*G06F 21/00* (2013.01)
*H04L 9/32* (2006.01)
(Continued)

(52) U.S. Cl.
CPC ............ *H04L 9/3242* (2013.01); *G06F 16/10* (2019.01); *G06F 16/93* (2019.01);
(Continued)

(58) Field of Classification Search
CPC ......... H04L 9/3242; H04L 9/14; H04L 63/06; G06F 16/10; G06F 16/93; G06F 21/6254; G06F 21/6272; G06F 21/64
See application file for complete search history.

(56) References Cited

U.S. PATENT DOCUMENTS 5,822,539 A * 10/1998 van Hoff ............... G06F 16/957
709/236
5,991,414 A * 11/1999 Garay .................... H04L 9/302
713/168
(Continued)

OTHER PUBLICATIONS

International Search Report dated Oct. 174, 2016 for International Application No. PCT/EP2016/068514 filed Aug. 3, 2016 by Escher Group Limited, 15 pages.

*Primary Examiner* — Don G Zhao
(74) *Attorney, Agent, or Firm* — Cesari and McKenna, LLP

(57) ABSTRACT

The subject matter herein is directed to a digital data locker that acts as an intermediary between end users operating end user device and document providers. The data locker provides the end user with a secure and easy way to manage, store, and retrieve data that is stored at the document providers. Specifically, the features provided by the data locker include, but are not limited to, a dual level of encryption for data, content assurance to determine whether the data is corrupted, and dissociation between an identity of an end user and the data of the end user stored at the document providers. More specifically, an end user device operated by the end user, through use of a single application, may access the data locker to securely store and retrieve data on/from the document providers.

14 Claims, 7 Drawing Sheets

Related U.S. Application Data continuation of application No. 15/950,637, filed on Apr. 11, 2018, now Pat. No. 10,484,180, which is a division of application No. 14/858,190, filed on Sep. 18, 2015, now Pat. No. 9,948,465.

(51) Int. Cl.

| | | |
|---|---|---|
| *G06F 16/10* | (2019.01) | |
| *G06F 16/93* | (2019.01) | |
| *G06F 21/62* | (2013.01) | |
| *G06F 21/64* | (2013.01) | |
| *H04L 9/14* | (2006.01) | |
| *H04L 9/40* | (2022.01) | |

(52) U.S. Cl.
CPC ...... *G06F 21/6254* (2013.01); *G06F 21/6272* (2013.01); *G06F 21/64* (2013.01); *H04L 9/14* (2013.01); *H04L 63/06* (2013.01)

(56) References Cited

U.S. PATENT DOCUMENTS

| | | | |
|---|---|---|---|
| 6,754,827 B1 | 6/2004 | Cane et al. | |
| 6,959,288 B1 | 10/2005 | Medina | |
| 6,978,378 B1* | 12/2005 | Koretz | H04L 63/0428 713/193 |
| 7,707,642 B1* | 4/2010 | Herbach | G06F 16/93 726/3 |
| 7,802,096 B1* | 9/2010 | Matthews | G06F 21/606 713/165 |
| 8,108,672 B1* | 1/2012 | Herbach | H04L 63/0861 713/168 |
| 9,288,056 B1* | 3/2016 | Spagnola | H04L 63/0876 |
| 9,473,516 B1* | 10/2016 | Jezorek | H04L 67/01 |
| 9,948,465 B2 | 4/2018 | Kilduff | G06F 16/93 |
| 11,038,692 B2 | 6/2021 | Kilduff | G06F 21/6254 |
| 11,409,901 B2* | 8/2022 | T | H04L 63/06 |
| 11,423,028 B2* | 8/2022 | Dupont | G06F 21/602 |
| 2003/0081247 A1* | 5/2003 | Sharma | G06F 21/608 358/1.15 |
| 2004/0143733 A1 | 7/2004 | Ophir et al. | |
| 2005/0091261 A1* | 4/2005 | Wu | G06F 21/64 707/999.102 |
| 2005/0097441 A1* | 5/2005 | Herbach | G06F 21/10 715/229 |
| 2005/0165623 A1* | 7/2005 | Landi | G16H 10/60 705/2 |
| 2006/0047977 A1* | 3/2006 | Hanasaki | H04L 63/06 713/193 |
| 2006/0229911 A1* | 10/2006 | Gropper | G16H 10/60 705/2 |
| 2007/0180125 A1* | 8/2007 | Knowles | G06F 16/9574 709/227 |
| 2007/0294537 A1* | 12/2007 | Peyravian | H04L 9/3297 713/178 |
| 2008/0052777 A1* | 2/2008 | Kawano | H04L 9/088 726/18 |
| 2008/0174790 A1* | 7/2008 | Noguchi | H04N 1/2187 358/1.1 |
| 2010/0217987 A1* | 8/2010 | Shevade | G06F 21/645 713/176 |
| 2010/0250934 A1* | 9/2010 | Watanabe | G06F 21/79 713/168 |
| 2010/0299313 A1* | 11/2010 | Orsini | G06F 21/602 707/652 |
| 2011/0060622 A1* | 3/2011 | Piersol | G06F 11/1474 707/637 |
| 2011/0060627 A1* | 3/2011 | Piersol | G06Q 30/0202 705/26.7 |
| 2011/0099629 A1* | 4/2011 | Boesgaard | G06F 21/64 726/22 |
| 2011/0173444 A1* | 7/2011 | Sato | H04N 1/4413 358/1.15 |
| 2012/0317414 A1* | 12/2012 | Glover | H04L 9/0861 713/165 |
| 2013/0136264 A1 | 5/2013 | Kim | |
| 2013/0212151 A1* | 8/2013 | Herbach | G06F 16/93 709/203 |
| 2013/0212707 A1* | 8/2013 | Donahue | G06F 21/6218 726/29 |
| 2013/0268740 A1* | 10/2013 | Holt | G06F 21/00 711/163 |
| 2014/0040611 A1* | 2/2014 | Tenenboym | H04L 9/3297 713/157 |
| 2014/0082376 A1* | 3/2014 | Roden | H04L 67/1097 713/193 |
| 2015/0106629 A1* | 4/2015 | Anderson | H04N 7/152 726/4 |
| 2015/0113279 A1* | 4/2015 | Andersen | G06F 21/6218 713/171 |
| 2015/0193465 A1 | 7/2015 | Schoeffler et al. | |
| 2015/0242332 A1* | 8/2015 | Kamath | G06F 12/1408 713/193 |
| 2015/0332178 A1* | 11/2015 | Sorotokin | G06Q 10/06 705/59 |
| 2015/0341401 A1* | 11/2015 | Lee | G06F 3/041 715/753 |
| 2015/0365385 A1* | 12/2015 | Hore | H04L 63/0428 713/152 |
| 2016/0028699 A1* | 1/2016 | Ambroz | H04L 9/3242 713/168 |
| 2016/0034713 A1 | 2/2016 | Ramirez | |
| 2016/0267022 A1 | 9/2016 | Schoenberger et al. | |
| 2016/0294781 A1* | 10/2016 | Ninan | H04L 63/0428 |
| 2016/0294832 A1* | 10/2016 | Pathak | G06F 21/10 |
| 2016/0373419 A1* | 12/2016 | Weigold | G06Q 20/06 |
| 2017/0293766 A1* | 10/2017 | Schnjakin | H04L 63/102 |

* cited by examiner

DIGITAL DATA LOCKER SYSTEM PROVIDING ENHANCED SECURITY AND PROTECTION FOR DATA STORAGE AND RETRIEVAL

CROSS REFERENCE TO RELATED APPLICATIONS

This application is a continuation of U.S. patent application Ser. No. 16/660,019 filed Oct. 22, 2019 by Alan Kilduff et al. entitled DIGITAL DATA LOCKER SYSTEM PROVIDING ENHANCED SECURITY AND PROTECTION FOR DATA STORAGE AND RETRIEVAL which is a continuation of U.S. patent application Ser. No. 15/950,637 filed Apr. 11, 2018 by Alan Kilduff et al. entitled DIGITAL DATA LOCKER SYSTEM PROVIDING ENHANCED SECURITY AND PROTECTION FOR DATA STORAGE AND RETRIEVAL, which is a divisional of U.S. patent application Ser. No. 14/858,190 filed Sep. 18, 2015 by Alan Kilduff et al. entitled DIGITAL DATA LOCKER SYSTEM PROVIDING ENHANCED SECURITY AND PROTECTION FOR DATA STORAGE AND RETRIEVAL, the contents of all of which are hereby incorporated by reference in their entirety.

BACKGROUND OF THE INVENTION

Field of the Invention

The subject matter herein relates to data security and protection, and, more specifically, to a digital data locker system providing enhanced security and protection for data storage and retrieval.

Background Information

Data may be maintained and managed by a plurality of different document providers associated with different entities. For example, a cable company may host its own system that maintains data (e.g. billing statement) for its end users while an online search company may host its own system that maintains data (e.g., photos) for its end users. As such, an individual end user will have to separately utilize a different portal maintained by each entity to access the documents maintained on the document provider of the entity. Thus, extra password management for the end user is required, and the entity incur an increased cost to maintain the individual portals. In addition, each entity may utilize different protection schemes and security schemes, some of which are inadequate and do not provide end users with the desired level of security and protection for their data. In addition, users may want to ensure that their identity is disassociated from their documents stored at the document providers and the entities may want to ensure that the documents they maintain are segregated from the documents maintained by other entities.

SUMMARY OF THE INVENTION

The subject matter herein is directed to a digital data locker system ("data locker") that acts as an intermediary between end users and document providers. The data locker provides the end user with a secure and easy way to manage, store, and retrieve data that are maintained by the document providers. Specifically, the features provided by the data locker include, but are not limited to, a dual level of encryption for data, content assurance to determine whether the data is corrupted, and dissociation between an identity of the end user and the data of the end user stored at the document providers. More specifically, an end user, utilizing an end user device, may utilize a single application to access the data locker to securely store and retrieve data on/from the plurality of different document providers. For example, a user, such as an entity (e.g., electric company) may store data (e.g., a bill) to be retrieved by its customers (e.g., users). Alternatively, a user (e.g., an individual) may store data to be later retrieved by that same user or by one or more other users (e.g., other individuals).

As such, the data locker provides an alternative to both physical mail and email and affords a far greater degree of security and privacy. Specifically, an end user may view and manage all their data, originating from different providers associated with different entities, in a secure and private manner through use of the data locker and a single application, thus reducing password fatigue and cutting costs by removing the need to maintain individual portals for each entity.

BRIEF DESCRIPTION OF THE DRAWINGS

The above and further advantages of the subject matter herein may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
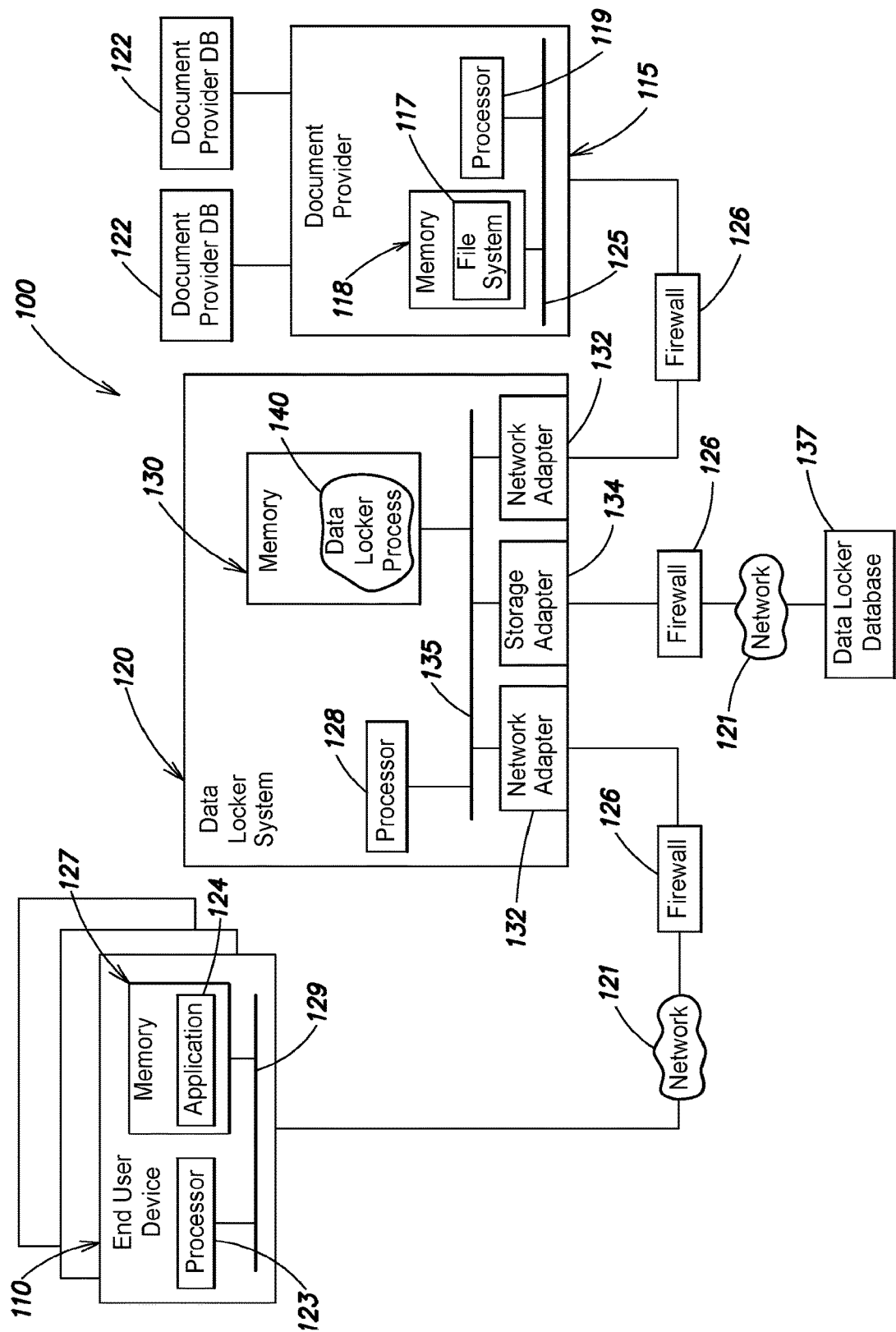
FIG. 1 is a schematic block diagram of a system environment.

FIG. 1 is a schematic block diagram of a system environment 100 that may be advantageously used with the subject matter described herein. The system environment 100 includes a digital data locker system ("data locker") 120, coupled to one or more data locker databases 137, and interconnected with one or more end user devices 110 and one or more document providers 115 over one or more network 121. The data locker may act as an intermediary between the end user devices 110 and document providers 115 and be configured to operate as part of a client/server arrangement, as will be understood by those skilled in the art, to provide services to the one or more end user devices 110. In one or more embodiments, the data locker 120 may also be coupled to a hybrid mail system (not shown) that is configured to transition end users from paper mail to electronic mail. Specifically, the data locker 120 may work in conjunction with a hybrid mail system and perform the functions as described herein.

Each end user device 110, operated by an end user, may be a general-purpose computer or a mobile device configured to execute applications and interact with the data locker 120 in accordance with the client/server model of information delivery to access data maintained and managed by the document providers 115. Specifically, the end user device 110 may include a processor 123 that executes an application 124, stored in memory 127, that includes one or more graphical user interfaces (GUIs). The processor 123 and memory 127 may be interconnected by bus 129. The application 124 may be downloaded or installed on the end user device 110 in a variety of ways, as known by those skilled in the art. The data locker 120 may maintain a website that allows the end user to download the application 124 to enable communication with the data locker 120. For example, the application 124 may be mobile application. That is, an end user operating the end user device 110 may utilize the application 124 to request the services of the data locker 120 to access data stored at the one or more document providers 115, as described in detail below, by exchanging packets over the networks 121. Thus, the end user operating the end user device 110 can access information originating from a plurality of different document providers 115, associated with different entities for example, utilizing application 124 of the data locker 120. In addition, the end user may utilize the application 124 to register with the data locker 120 to obtain the services of the data locker 120. Specifically, the end user may provide personal information (e.g., name, address, social security number, etc.) to obtain a username and password to register with the data locker 120. It is noted that the end user may utilize the application 124 to register with the data locker 120 utilizing an outside service, such as a registration server (not shown), that communicates with the data locker 120 to register the end user. Alternatively, the end user may register by exclusively interacting with the data locker 120.

The end user devices 110 may issue packets including Hypertext Transfer Protocol (HTTP) when accessing data. Alternatively, the end user devices 110 may utilize file-based access protocols, such as the Common Internet File System (CIFS) protocol or Network File System (NFS) protocol, over TCP/IP when accessing data. Alternatively, the end user device 110 may issue packets including block-based access protocols, such as the Small Computer Systems Interface (SCSI) protocol encapsulated over TCP (iSCSI) and SCSI encapsulated over Fibre Channel (FCP), when accessing data. As used herein, the term "data" means information that is human-readable, some example of which are: files, documents, images, and emails. Illustratively, one or more networks 121 may be embodied as an Ethernet network or a Fibre Channel (FC) network, for example. It is noted that the network 121 between the end user devices 110 and the data locker 120, and the network 121 between the data locker 120 and document providers 115, may be the same network or different networks, such as, but not limited to, local area networks and wide area networks.

As such, a plurality of different document providers can be accessed in a secure manner by the end user devices 110, through utilization of the data locker 120, as described herein. Each document provider 115 may include a file system 117, residing in memory 118, and executed by processor 119. The file system 117 may be utilized to organize and access data stored, for example, on document provider databases 122 or memory 118, which is requested by end user devices 110. Specifically, the file system 117 may further be utilized to logically organize the data stored on document provider database 122 or memory 118. The processor 119 and memory 118 may be interconnected by system bus 125. The processor 119 may perform a variety of functions, such as, but not limited to, encryption of data, decryption of data, generation of hash values, comparisons, etc., as described in further detail below. For example, the document provider 115 may makes use of SQL Server File Stream technology for storing data, which allows for the storage of unstructured data alongside its associated structured data in a document provider databases 122, thus ensuring transactional integrity, while maintaining the file streaming and caching performance advantages of the file system 117.

A series of firewalls 126 monitor and control the incoming and outgoing requests, from the end user devices 110 and document providers 115 based on an applied security rules, as known by those skilled in the art. Firewalls 126 may also establish a barrier between a trusted, secure internal network, such as the data locker 120, and another outside network, such as the Internet, that is assumed to not be secure or trusted. Advantageously, public interfaces have no direct access to the internal processes and data structures of the data locker 120. It is noted that the firewalls 126 may be the same or different at different locations in the system 100.

The data locker 120 includes a processor 128, a memory 130, network adapters 132, and a storage adapter 134 interconnected by a system bus 135. The network adapters 132 comprises the mechanical, electrical and signaling circuitry needed to connect the data locker 120 to end user devices 110 and the document providers 115 over the networks 121. The storage adapter 134 may be utilized to access data stored on the one or more data locker databases 137, as described in further detail below. The storage adapter 134 includes input/output (I/O) interface circuitry that couples to the data locker databases 137 an I/O interconnect arrangement, such as a conventional high-performance, FC serial link topology.

The memory 130 includes storage locations that are addressable by the processor and adapters for storing software program code. The processors and adapters may include processing elements and/or logic circuitry configured to execute the software programs/processes and manipulate the data structures. It will be apparent to those skilled in the art that other processing and memory means, including various computer readable media, may be used for storing and executing program instructions pertaining to the embodiments described herein. It is also expressly contemplated that the various software programs, processors and layers described herein may be embodied as modules configured to operate in accordance with the disclosure, e.g., according to the functionality of a software program, process or layer. The memory 130 may include data locker process 140 executable by the processor 128 that perform a variety of functions as described in further detail below and associated with the embodiments described herein. For example, such functions may include, but are not limited to, dual level encryption, content assurance, and disassociation of an identity of an end user and data of the end user, and end user registration.

Figure 2:
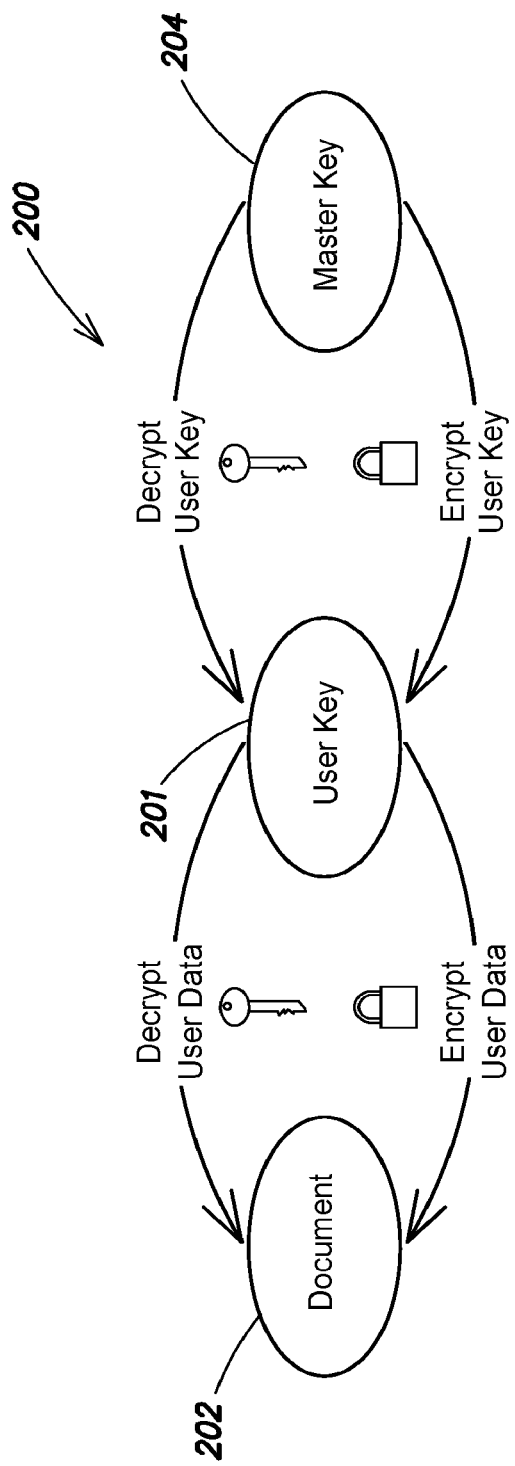
FIG. 2 is a schematic block diagram associated with performing an encryption process according to the subject matter described herein.

FIG. 2 is a schematic block diagram showing a dual level encryption process according to the subject matter described herein. Specifically, the functions associated with the encryption process may be performed by the data locker process 140 executed by the processor 128 of the data locker 120. For example, each end user, operating an end user device 110, may be assigned its own a unique user symmetric key 201 ("user key") (e.g., AES 256 key) which is used to encrypt and decrypt data, such as a document 202 that is stored and maintained by the document providers 115 and is associated with the end user. The assigned user key 201 may be any encryption key which provides a desired level of security, as known by those skilled in the art.

The user key 201 is in turn protected and encrypted/decrypted by a master key 204 (e.g., RSA 2048 PKI infrastructure), thus providing further encryption protection. Specifically, and because the user key 201 assigned to the end user is further encrypted by the master key 204, an unauthorized user intending to obtain the document 202 (stored and maintained separately by the document provider 115) would need both keys to decrypt and obtain the document 202. More specifically, the unauthorized user would first have to decrypt the user key 201 with the master key 204, then decrypt the document 202 with the decrypted user key 201. In an embodiment, the master key 204 may be stored at the data locker 120. For example, the master key 204 may be stored in the memory 130 in a Secured Certificate/Key store or a hardware security module (not shown). Alternatively, the master key 204 may be stored remotely at a particular the document provider 115. It is noted that both the master key 204 and the individual user key 201 are regularly cycled to curtail any attack window, as known by those skilled in the art.

Figure 3:
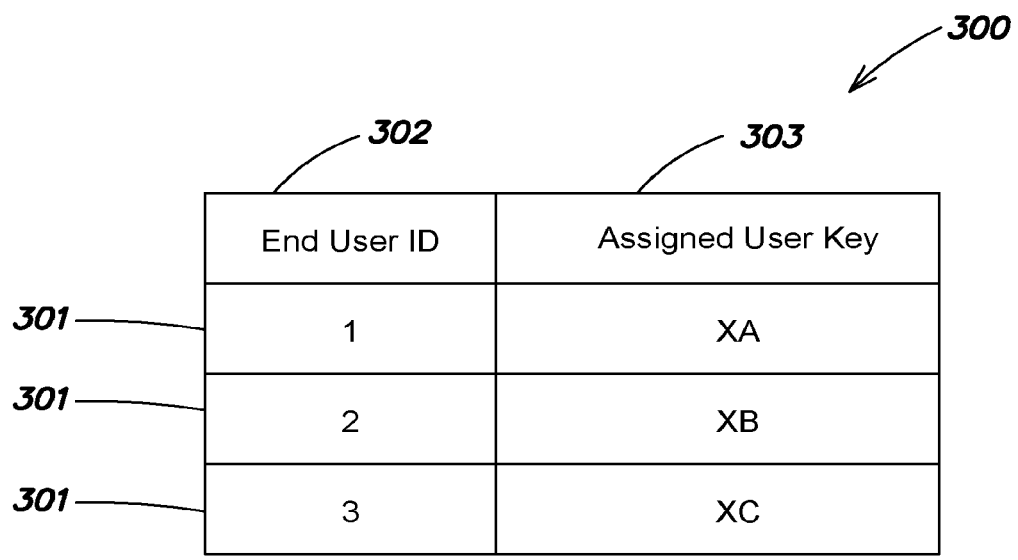
FIG. 3 is a schematic block diagram of an assigned key mapping table.

The unique user key 201 may be stored in the data locker database 117. Specifically, FIG. 3 shows an assigned key mapping table 300 that may be stored in the data locker database 137 and that includes one or more entries 301 that store an association between an ID of the end user (e.g., a unique identifier assigned to the end user) and an assigned user key. Specifically, each entry has an end user ID field 302 that stores an identifier of the end user and an assigned user key field 303 that stores the user key 201 assigned to the end user. For example, and as shown in FIG. 3, end user 1 is assigned user key XA, end user 2 is assigned user key XB, and end user 3 is assigned user key XC. It is expressly contemplated that the designation of an end user being assigned a specific user key in mapping table 300 is simply for illustrative purposes only and the association between the end user and an assigned user key 201 may be done in a variety of ways and may be stored in a variety of data structures.

Figure 4:
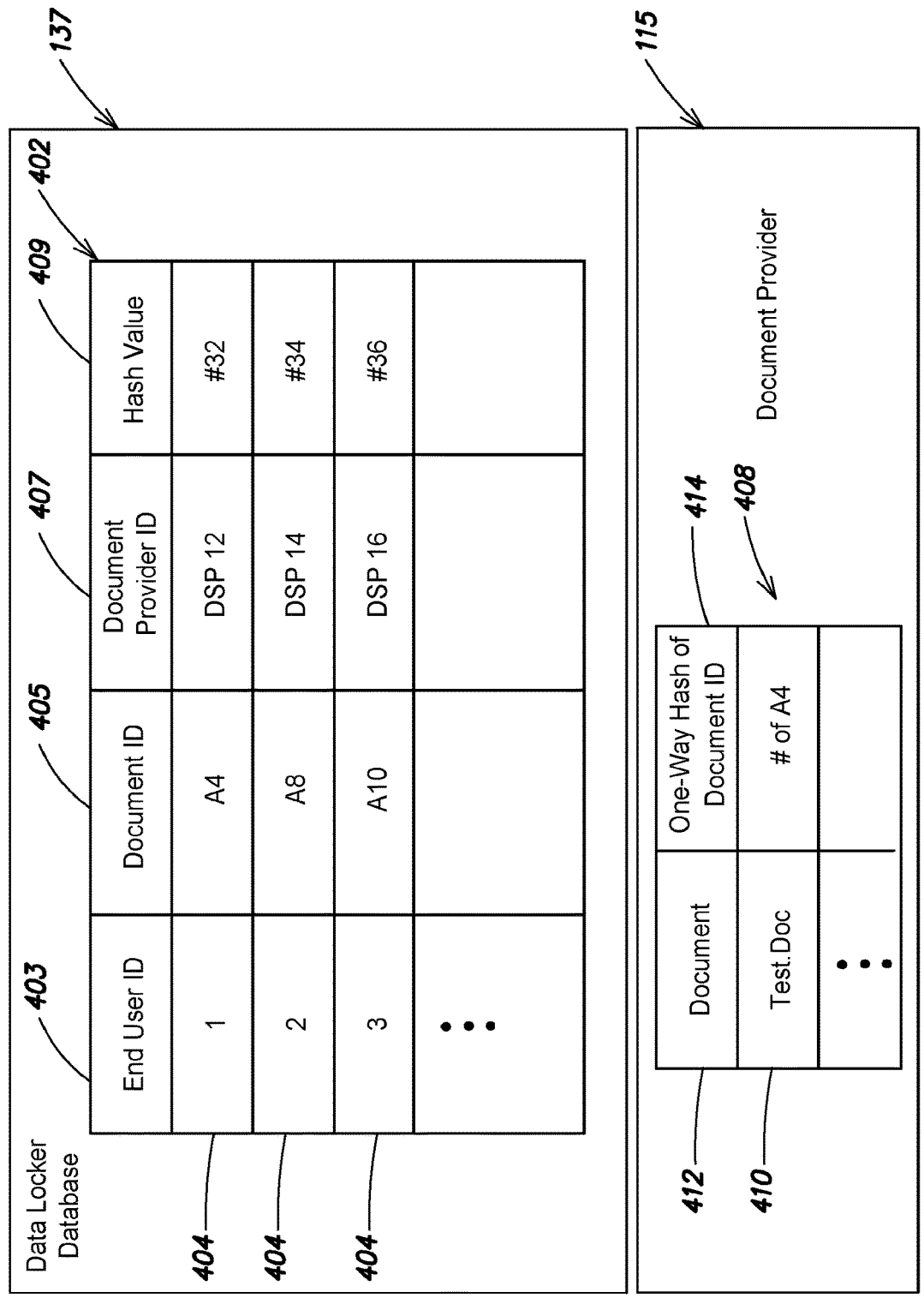
FIG. 4 is a schematic block diagram associated with performing a disassociation process according to the subject matter described herein.

FIG. 4 is a schematic block diagram related to a disassociation process according to the subject matter described herein. Specifically, the functions related to the disassociation process may be performed by the data locker process 140, executed by the processor 128, in conjunction with the processor 119 of the document provider 115. The data locker 120 may store a document ID mapping table 402 stored in data locker database 137. The document ID mapping table 402 stores one or more entries 404. Each is entry 404 includes an end user ID field 403 storing an identifier of the end user (e.g., a unique identifier assigned to the end user), a document ID field 405 storing an identifier for a document created or owned by the end user, a document provider ID field 407 storing an identifier of the document provider storing and maintaining the document, and a hash value field 409 storing a hash value generated from the document that is generated by and received from the document provider 115. It is noted that the values in the fields of the entries 404 are simply exemplary in nature and that a variety of values and combination of values may be used.

The document provider 115 may store a document table 408 having a plurality of entries 410 where each entry 410 stores an association between a stored document and a hash value of the document ID of the document. The document table 408 may be stored in database 122 or memory 118. Specifically, each entry may include a document field 412 storing a reference to the stored document (e.g., test.doc stored in document provider database 122 or memory 118) and a hash of document ID field 414 storing a hash value generated from the document ID by the document provider 115. Specifically, a one-way hash function (cryptographic hash function) may be utilized to generate the hash of the document ID such that the original document ID cannot be reconstructed, as known by those skilled in the art. The document table 408 may be created by the processor 119 and may be stored, for example, in the document provider database 122. Specifically, one or more hash keys (not shown), maintained and stored by the document service provider 115 (e.g., in memory 118 or on the document service provider database 122), may be utilized to generate the one-way hash value of the document ID. For example, the document provider 115 may receive the document ID (e.g., A4 stored in field 409 of a particular entry 404) from the data locker 120, and specifically from a particular entry 404 of document ID mapping table 402, and then generate a one-way hash of the received document ID utilizing the one or more hash key. The one-way hash value may then be stored in field 414 of a particular entry 410 of table 408. For example, and with reference to FIG. 4, a reference to test.doc is stored in field 410 along with a hash of document ID A4 stored in field 414 of an entry 410. It is noted that the values in the fields of the entries 410 are simply exemplary in nature and that a variety of values and combination of values may be used.

As such, the document (e.g., test.doc) is stored and maintained at the document provider 115 and the identity of the end user (e.g., end user 1) is maintained and stored at data locker 120. Thus, the document is disassociated from the identity of the end user. Specifically, the document provider 115 maintains no information regarding the identity of the end user and prevents the grouping a plurality of documents, for example, associated with a single end user, stored and maintained by the document provider 115. More specifically, because the document provider 115 maintains the reference to the document with a hash value of the document ID, the document provider 115 must obtain a document ID (un-hashed) from the data locker 120 and then hash that received value to determine which document is being requested. As such, the storage of the document at the document provider 115 is disassociated from the identity of the end user maintained at the data locker 120.

Figure 5:
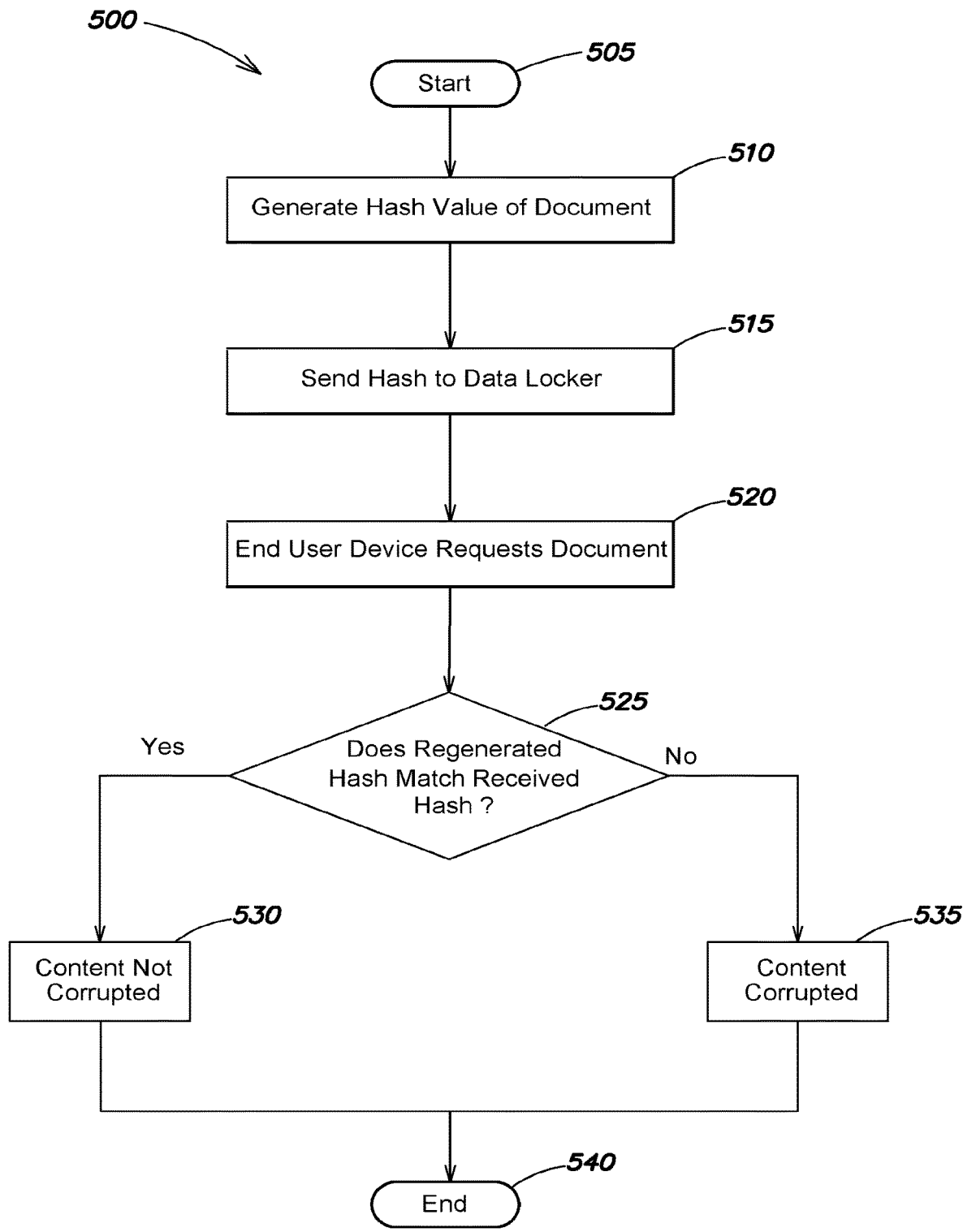
FIG. 5 is a flowchart detailing the steps of a procedure for performing a content assurance process according to the subject matter described herein.

FIG. 5 is a flowchart detailing the steps of a procedure 500 for performing a content assurance process according to the subject matter described herein. Specifically, the functions associated with the content assurance process may be performed by the data locker process 140, executed by the processor 128, in conjunction with the processor 119 of the document provider 115. The content assurance process determines whether the document referenced in field 412 of document table 408, stored and maintained by the document provider 115, has been corrupted. The procedure 500 starts at step 505 and continues to step 510 where a hash of the document is generated. Specifically, one or more hash keys (not shown), maintained and stored by the document provider 115 (e.g., in memory 118 or on the document provider database 122), may be utilized to generate the hash value of the received document. It is noted that the hash of the document is not a one-way hash, but is instead a hash value that may be regenerated, as described in further detail below. For example, an end user may desire to store and maintain a document at the document provider 115 and may utilize the application 124 executing on the end user device 110 to transmit the document to the data locker 120. The document provider 115 may then receive the document from the data locker 120 over the network 121 and generate a hash value of the document utilizing the hash key.

The procedure continues to step 515 and the hash value is sent to the data locker 120. Specifically, after the document has been hashed by the document provider 115, the generated hash value is sent over the network 121 to the data locker 120 for storage. For example, the hash value may be stored in a corresponding entry 404 of the document ID mapping table 402 as described with reference to FIG. 4 (e.g., in hash value field 409). The procedure continues to step 520, and the end user requests the document. Specifically, the end user may utilize the application 124 executing on the end user device 110 to send the request for the document to the data locker 120. After the end user requests the document, the data locker 120 sends the request with the hash value (e.g., stored in hash value field 409) to the document provider 115. The procedure continues to step 525, and the document provider 115 determines if the received hash value matches a regenerated hash value. Specifically, the document provider 115 regenerates a hash value of the document utilizing the same hash key and compares the regenerated hash value with the hash value received from the data locker 120.

If the hash values match at step 525, the procedure continues to step 530 and it is determined that the document has not been corrupted or tampered with. If desired, the data locker 120 may receive a confirmation message from the document provider 115 indicating that the document has not been corrupted. The data locker 120 may then utilize the application 124, and specifically the GUIs of the application 124, executing on the end user device 110, to send the confirmation to the end user. For example, the GUIs of the application 124 may display a confirmation message on the end user device 110 stating that the document is not corrupted. In addition, the data locker 120 may send the document to the end user device 110 such that the end user may access the document through use of the application 124.

If the hash values do not match at step 525, the procedure continues to step 535 and it is determined that the document has been corrupted. Specifically, and based on determining that the document has been corrupted, measures can be taken, such as, but not limited to, notifying the end user that the document has been corrupted. Specifically, when the hash values do not match, the data locker 120 may receive a message from the document provider 115 indicating that the document has been corrupted and the data locker 120 may send a message to the end user. For example, the GUI of the application 124 may display a message on the end user device 110 stating that the document has been corrupted. In addition or alternatively, other functions may be performed, such as, but not limited to, notifying an administrator. The procedure ends at step 540.

Figure 6:
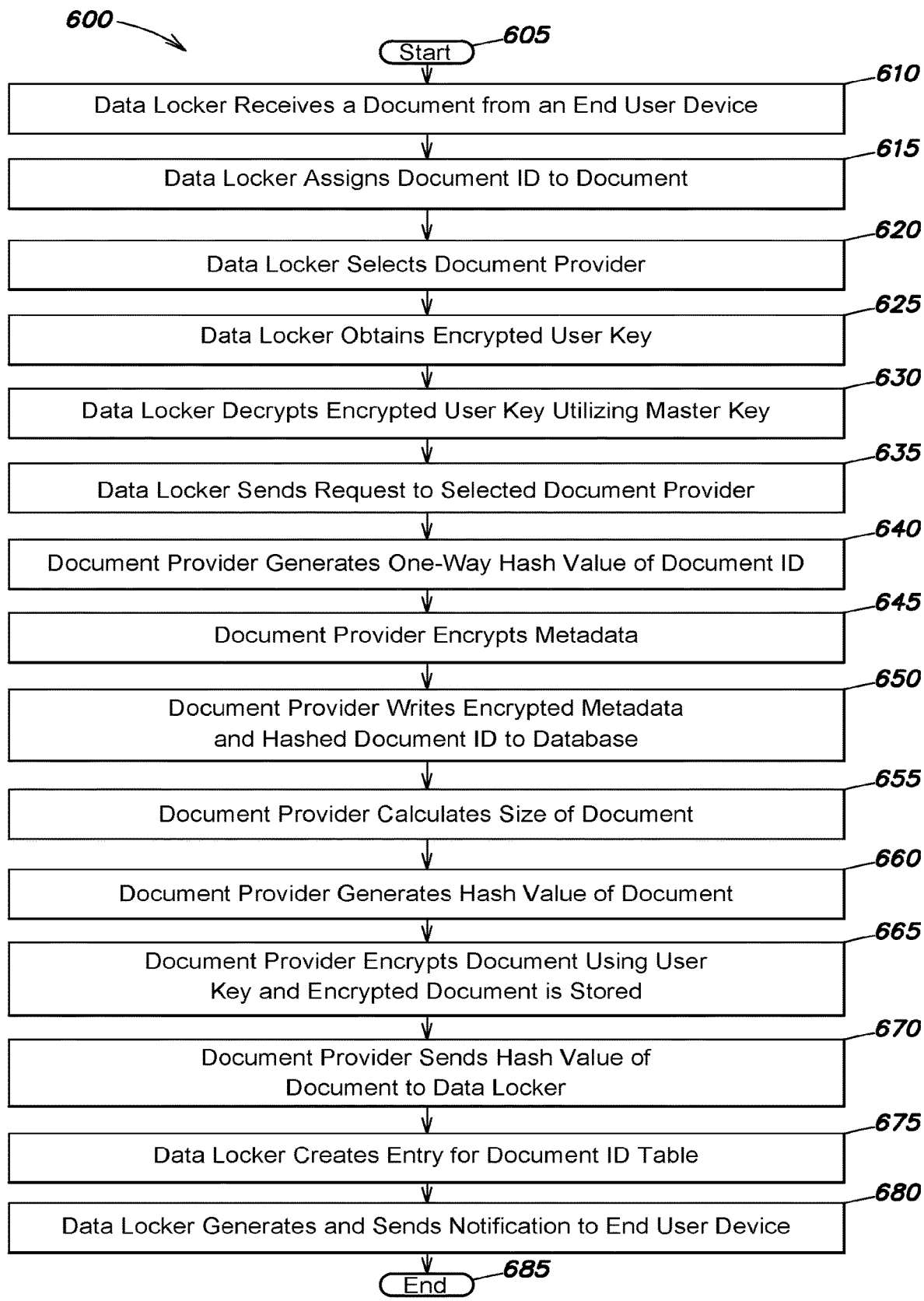
FIG. 6 is a flowchart detailing the steps of a procedure for saving a document according to the subject matter described herein.

FIG. 6 is a flowchart detailing the steps of a procedure for saving a document according to the subject matter described herein. Specifically, procedure 600 starts at 605 and continues to 610 where the data locker 120 receives a document. Specifically, the document may be received from an end user (e.g., an entity individual) that wants to share the information with one or more other users (e.g., customers). Alternatively, the end user may want to store a document for later retrieval. For example, the end user may create the document and send it over the network 121 to the data locker 120 utilizing the application 124 executing on the end user device 110. The procedure continues to step 615 where the data locker 120 assigns a unique identifier to the document. For example, and upon receiving the document from the end user device 110, the data locker 120 may assign an identifier to the document such that the document can be distinguished from all other documents. The procedure continues to step 620, and the data locker 120 selects a document provider to store the document. For example, the data locker 120 may select a particular document provider 115 based on a variety of factors and/or an algorithm (e.g., round-robin technique). For example, the document type might dictate which document provider is selected. In addition or alternatively, a geographical location of the end user device 110 and/or the document provider 115 may dictate which document provider is selected. In addition or alternatively, the size of the document may dictate which document provider is selected. It is expressly contemplated that a variety of factors can be utilized to select a particular document provider.

The procedure continues to step 625, and the data locker 120 obtains the encrypted user key from the data locker database 137. Specifically, the data locker 120 utilizes an identifier associated with the end user (e.g., a unique identifier assigned to the end user) to index into assigned key mapping table 300 to obtain the corresponding encrypted user key for the end user. For example, and with reference to FIG. 3, the end user ID of "1" may be utilized to index into table 300 to obtain the corresponding assigned user key of XA. The procedure continues to step 630, and the data locker 120 decrypts the encrypted user key (e.g., XA) utilizing the master key. For example, the data locker 120 obtains the master key from the memory 130 and decrypts the encrypted user key to produce a decrypted user key. Alternatively, data locker 120 may obtain the master key from the document provider 115 to decrypt the encrypted user key. The procedure continues to step 635, and a request is sent from the data locker 120 to the selected document provider 115 to store the document. For example, the request may be accompanied by the document, the decrypted user key, and the document ID. The request may be sent from the data locker 120 to the selected document provider 115 over the network 121.

The procedure continues to step 640, and the document provider 115 generates a one-way hash value of the document ID. Specifically, the document provider 115 obtains the hash key (e.g., stored in memory 118 of the selected document provider 115 or the document provider database 122) and generates the one-way hash of the document ID received from the data locker 120. The procedure continues to step 645, and metadata associated with the document is encrypted. For example, the processor 119 of the document provider 115 may utilize a stored encrypted key (e.g., stored in memory 118 or on document provider database 122) to encrypt the metadata. Such metadata may include descriptive information associated with the document. For example, if the document is a bill, the metadata may be an account number, date, billing statement number, etc. The metadata may be utilized to assist in categorizing the document and to differentiate the document from other different documents. For example, the metadata may be displayed on the end user device 110 to assist the end user in searching and sorting documents as well as allowing the end user to request a document of interest. The procedure continues to step 650, and the document provider 115 writes the encrypted meta data and the one-way hashed document ID to the document provider database 122. The procedure continues to step 655, and the document provider 115 calculates a size of the document. For example, the processor 119 of the document provider 115 calculates the size of the document, utilizing known techniques, to determine if the document will be stored in the memory 118 of the document provider 115 or the document provider database 122 of the document provider 115. Specifically, the size of the document may dictate whether the document is stored as a standard SQL BLOB in the document provider database 122 or as a SQL FILESTREAM BLOB in the memory 118 of the document provider 115.

The procedure continues to step 660, and the document provider 115 generates a hash value of the document. Specifically, the processor 119 of the document provider 115 generates the hash value of the document utilizing a hash key. The procedure continues to step 665, and the document provider 115 encrypts the document using the user key and the encrypted document is stored. For example, the processor 119 of the document provider 115 encrypts the received document using the received user key and may then discard or destroy the user key, and the encrypted document is stored with the hashed document ID (e.g., in memory 118 or the database 117) for example, as described with reference to FIG. 4. Specifically, the document and hash value of the document ID are stored in the fields 412 and 408 of the entry 410 of the document table 408.

The procedure continues to step 670, and the document provider 115 sends the hashed value of the document to the data locker 120. Specifically, the processor 119 of the document provider 115 sends the hash value of the document to the data locker over 120 the computer network 121. The procedure continues to step 675, and the data locker 120 creates an entry for the document ID mapping table 402. For example, and with reference with to FIG. 4, the entry 404 is created for document ID mapping table 402 that stores the particular values in the fields 403, 405, 407, and 409. The procedure continues to step 680, and the data locker 120 generates and sends a notification to the end user device 110 indicating that that the document has been stored successfully. Specifically, the notification is displayed on end user device 110 through the application 124. Alternatively, the end user may receive a Short Message Service (SMS) or email as the notification. It is noted that if the end user is storing the document to be retrieved by one or more other users, the one or more other users may also receive a notification that the document has been stored for their retrieval. The procedure then ends at step 685.

Figure 7:
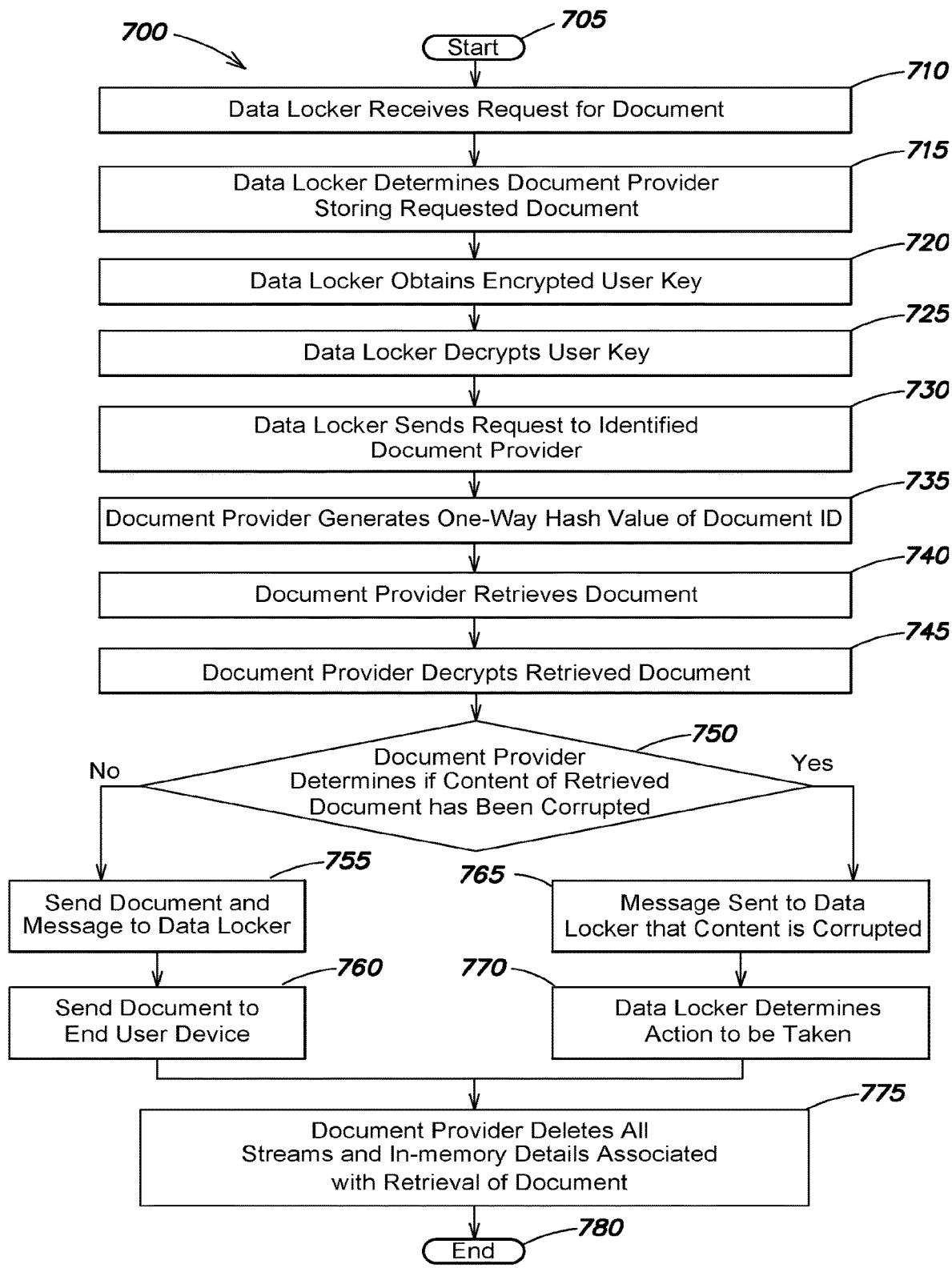
FIG. 7 is a flowchart detailing the steps of a procedure for retrieving a document according to the subject matter described herein.

FIG. 7 is a flowchart detailing the steps of a procedure for retrieving a document according to the subject matter described herein. For example, the end user may be retrieving a document stored by a different user or entity on the document providers. Alternatively, the end user may be retrieving a document that they had previously stored on the document providers. Specifically, procedure 700 starts at 705 and continues to 710 where the data locker 120 receives a request for a document. For example, the end user may utilize the application 124 executing on the end user device 110 to send a request that includes a document ID associated with a particular document of interest. The procedure continues to step 715 where the data locker 120 determines the document provider 115 storing the requested document. For example, the data locker 120 may index into the document ID mapping table 402 utilizing the end user ID and/or document ID to obtain the corresponding document provider ID (DSP 12) stored in field 407 of entry 404 to determine the document provider 115 storing the requested document. The procedure continues to step 720, and the data locker 120 obtains the encrypted user key from the data locker database 137. Specifically, the data locker 120 utilizes an identifier associated with the end user (e.g., unique identifier assigned to the end user) to index into the assigned key mapping table 300 to obtain the corresponding encrypted user key for the end user.

The procedure continues to step 725, and the data locker 120 decrypts the encrypted user key (e.g., XA) utilizing the master key. For example, the data locker 120 obtains the master key from the memory 130 and decrypts the encrypted user key to produce a decrypted user key. Alternatively, data locker 120 may obtain the master key from the document provider 115 and decrypts the encrypted user key. The procedure continues to step 730, and the data locker 120 sends a request to the identified document provider 115. For example, the request may be accompanied by the document ID (e.g., stored in field 405), a size of the document, a hash value of the document (e.g., stored in field 409) and the decrypted user key.

The procedure continues to step 735, and the document provider 115 generates a hash value of the received document ID. Specifically, the processor 119 of the document provider 115 generates a hash value of the document ID, in the received request, utilizing a stored hash key. The procedure continues to step 740, and the document provider 115 retrieves the document. For example, the processor 119 of the document provider utilizes the hash value of the document ID to index into the document table 408 to obtain the corresponding reference to the document in entry 410. The document may then be retrieved from the document server database 122 or memory 118, by the document provider 115, utilizing the reference in the document table 408. The procedure continues to step 745, and the document is decrypted using the user key. Specifically, the processor 119 of the document provider 115 utilizes the user key, received from the data locker 120, to decrypt the retrieved document. It is noted that the document provider 115 may destroy the user key after decrypting the encrypted document. The procedure continues to step 750, and the document provider 115 determines if the document has been corrupted. Specifically, the processor 119 of the document provider 115 determines if the document has been corrupted in the manner as described with reference to FIG. 5. More specifically, and with reference to FIG. 5, the processor 119 compares the received hash value with the regenerated hash value.

If at step 750 it is determined that the document has not been corrupted, the procedure continues to step 755 and the document and/or a confirmation message is sent to the data locker 120 indicating that the document has not been corrupted. Specifically, the document provider 115 sends the document and/or the confirmation message to the data locker 120 over the network 121. The procedure continues to step 760, and the data locker 120 sends the document to the end user device 110. Specifically, the data locker 120 sends the document to the end user device 110 over the network 121, such that the end user can access the document through the application 124. The end user may then view and/or edit the document. In addition, it is noted that the data locker 120 may send the confirmation message to the end user device 110 indicating that the document has not been corrupted.

If at step 750 it is determined that the document has been corrupted, the procedure continues to step 765 and a message is sent to the data locker 120 indicating that the document has been corrupted. Specifically, the documents service provider 115 sends the message to the data locker 120 over the network 121. The procedure continues to step 770, and the data locker 120 determines an action to be taken due to the corrupted document. For example, the data locker 120 may send a message to the end user device 110 over the network 121 indicating that the document has been corrupted utilizing the application 124. Alternatively, a message may be sent to an administrator. The procedure continues to step 775, and the document provider 115 deletes all streams and in-memory details associated with the retrieval of the document. It is noted that the streams and in-memory details may be deleted after each step in FIG. 7 is performed. The procedure ends at step 780.

The foregoing description has been directed to specific subject matter. It will be apparent, however, that other variations and modifications may be made to the described subject matter, with the attainment of some or all of its advantages. It is expressly contemplated that the procedures, processes, and methods described herein may be implemented in alternative orders. For example, although reference is made to data locker process 140 performing the functions associated herein, it is expressly contemplated than any number of other processes may perform the functions described here. In addition, although reference is made to a document, it is expressly contemplated that any data may be utilized with the embodiments described above. Accordingly this description is to be taken only by way of example and not to otherwise limit the scope of the subject matter described herein. Therefore, it is the object of the appended claims to cover all such variations and modifications as come within the true spirit and scope of the subject matter.

What is claimed is:

1. A document provider comprising:
one or more network interfaces interconnecting the document provider with a data locker over one or more networks;
a memory;
a processor coupled to the memory, the processor when executed configured to:
receive a request to store a document from the data locker and over the one or more networks, wherein the request is initiated at an end user device operated by an end user and wherein the request includes the document, a decrypted user key associated with the end user, and a document identifier that identifies the document;
generate a first one-way hash of the document identifier utilizing a one-way hash key;
encrypt the document utilizing the decrypted user key to generate an encrypted document, wherein the decrypted user key is not maintained at the document provider after the encrypting; and
store the encrypted document with the first one-way hash of the document identifier such that the document can only be identified based on receiving the document identifier that is un-hashed and such that the encrypted document stored at the document provider is disassociated from an identifier of the end user.

2. The document provider of claim 1, wherein the processor is further configured to:
receive a document request, via the data locker and over the one or more networks, for the document stored at the document provider, wherein the document request includes at least the document identifier and the decrypted user key;
generate a second one-way has of the document identifier, in the document request, utilizing the one-way hash key; and
identify the encrypted document stored at the document provider based on a match of the first one-way hash and the second one-way hash.

3. The document provider of claim 2, wherein the processor is further configured to decrypt the encrypted document, identified based on the match, utilizing the decrypted user key in the document request.

4. The document provider of claim 1, wherein the processor is further configured to:
generate a hash value of the document utilizing a hash key; and
transmit the hash value to the data locker for storage with the identifier of the end user.

5. The document provider of claim 4, wherein the process is further configured to:
receive a document request, via the data locker and over the one or more networks, for the document stored at the document provider, wherein the document request includes at least the document identifier and the hash value stored at the data locker;
generate a regenerated hash value for the document utilizing the hash key;
determine that the document has not been corrupted when the hash value received in the document request matches the regenerated hash value; and
transmit the document to the data locker in response to determining that the document has not been corrupted.

6. The document provider of claim 5, wherein the processor is further configured to:
determine that the document has been corrupted when the hash value received in the document request does not match the regenerated hash value; and
transmit a message to the data locker indicating that the document has been corrupted in response to determining that hash value received in the document request does not match the regenerated hash value.

7. The document provider of claim 5, wherein the processor is further configured to transmit a confirmation message to the data locker indicating that the document has not been corrupted in response to determining that the hash value received in the document request matches the regenerated hash value.

8. A method comprising:
receiving, at a document provider over one or more networks from a data locker, a request to store a document, wherein the request is initiated at an end user device operated by an end user and wherein the request includes the document, a decrypted user key associated with the end user, and a document identifier that identifies the document;
generating, at the document provider, a first one-way hash of the document identifier utilizing a one-way hash key;
encrypting, at the document provider, the document utilizing the decrypted user key to generate an encrypted document, wherein the decrypted user key is not maintained at the document provider after the encrypting; and
storing, at the document provider, the encrypted document with the first one-way hash of the document identifier such that the document can only be identified based on receiving the document identifier that is un-hashed and such that the encrypted document stored at the document provider is disassociated from an identifier of the end user.

9. The method of claim 8, further comprising:
receiving a document request, from the data locker over the one or more networks, for the document stored at the document provider, wherein the document request includes at least the document identifier and the decrypted user key;

generating a second one-way has of the document identifier, in the document request, utilizing the one-way hash key; and identifying the encrypted document stored at the document provider based on a match of the first one-way hash and the second one-way hash.

10. The method of claim 9, further comprising decrypting the encrypted document, identified based on the match, utilizing the decrypted user key in the document request.

11. The method of claim 8, further comprising:

generating, at the document provider, a hash value of the document utilizing a hash key; and transmitting, from the document provider, the hash value to the data locker for storage with the identifier of the end user.

12. The method of claim 11, further comprising:

receiving a document request, via the data locker and over the one or more networks, for the document stored at the document provider, wherein the document request includes at least the document identifier and the hash value stored at the data locker;

generating a regenerated hash value for the document utilizing the hash key;

determining that the document has not been corrupted when the hash value received in the document request matches the regenerated hash value; and transmitting the document to the data locker in response to determining that the document has not been corrupted.

13. The method of claim 12, further comprising:

determining that the document has been corrupted when the hash value received in the document request does not match the regenerated hash value; and transmitting a message to the data locker indicating that the document has been corrupted in response to determining that hash value received in the document request does not match the regenerated hash value.

14. The method of claim 12, further comprising transmitting a confirmation message to the data locker indicating that the document has not been corrupted in response to determining that the hash value received in the document request matches the regenerated hash value.

* * * * *